(12) United States Patent
Rijavec (10) Patent No.: US 6,256,111 B1
(45) Date of Patent: Jul. 3, 2001

(54) CALIBRATING DIGITAL HALFTONING ALGORITHMS WITH MULTIPLE PERSONALITIES

(75) Inventor: Nenad Rijavec, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/100,915

(22) Filed: Jun. 19, 1998

(51) Int. Cl.[7] .............................. B41B 15/00; B41J 15/00; G06F 15/00; H04N 1/40

(52) U.S. Cl. ..................... 358/1.9; 358/1.13; 358/1.15; 358/1.16; 358/456; 358/457; 358/458

(58) Field of Search ..................... 358/1.9, 1.13, 358/1.15, 1.16, 456, 457, 458, 460, 466, 298, 534, 535, 536; 382/237, 252, 270; 399/9, 15, 38, 53, 60, 72; 347/19, 188, 118

(56) References Cited

U.S. PATENT DOCUMENTS

| | | | |
|---|---|---|---|
| 5,406,070 | * | 4/1995 | Edgar et al. ............ 250/208.1 |
| 6,046,820 | * | 4/2000 | Konishi ..................... 358/1.9 |

* cited by examiner

Primary Examiner—Edward Coles
Assistant Examiner—Twyler Lamb
(74) Attorney, Agent, or Firm—Gates & Cooper LLP (57) ABSTRACT

A method, apparatus, and article of manufacture for updating the calibration of a printer or printers which use multiple calibration functions. The method comprises the steps of applying the first calibration function to grayscale commands to obtain modified grayscale commands, printing the grayscale patches with the modified printing commands, and measuring the resulting grayscale values. Using this data, an updated printer calibration function $t(i)$ is generated such that mapping the printer commands through $t(i)$ results in printed grayscales substantially matching the commanded grayscales. Then, the updated printer calibration function $t(i)$ is used to update the printer calibration function $f(i)$ to obtain $g(i)$. The apparatus comprises a means for obtaining modified grayscale commands by applying a first calibration function, a printer to print grayscale patches with the modified printing commands, and a scanner or densitometer for measuring the resulting grayscale values. The apparatus also comprises a means for obtaining an updated printer calibration function and a means for deriving an updated function $g(i)$ based on the updated printer calibration function. In an alternative embodiment, the foregoing is used to update scanner calibration.

22 Claims, 8 Drawing Sheets

CALIBRATING DIGITAL HALFTONING ALGORITHMS WITH MULTIPLE PERSONALITIES

CROSS-REFERENCE TO RELATED APPLICATIONS

This application is related to the following co-pending and commonly-assigned applications, all of which are incorporated by reference herein:

Application Ser. No. 09/100,487, filed on same date herewith, by Ho Chong Lee and Mikel J. Stanich, entitled "Printer Calibration Scheme,"; and Application Ser. No. 09/100,055 filed on same date herewith, by Ho Chong Lee, Mikel J. Stanich, and Jack L. Zable, entitled "Half-Tone Screen Calibrations,".

BACKGROUND OF THE INVENTION

1. Field of the Invention

The present invention relates to network printing systems, and in particular, to a method and apparatus for calibrating digital halftoning algorithms with multiple personalities.

2. Description of the Related Art

Network printing systems generally comprise an assemblage of different printers, client computers, servers, and other components connected over a network. A print job is assembled at a client computer and transmitted over the network to a server linked to a variety of printers. Although these printers have historically been used to reproduce text, they are increasingly being used to reproduce graphic and image files, which have significant grayscale content.

Digital printers with grayscale reproduction capabilities use half tone screens with or without dot density control (contone) to reproduce the grayscales. Due to differences printer personalities such as dot gain characteristics, types of screens, and contone designs, grayscale profiles can vary widely from printer to printer. Consequently, when graphic and image files generated for a particular grayscale profile are sent to a printer with a different profile, the appearance of the printed output may be substantially different. Such variations are more pronounced among bi-level printers, because dots are not as easily controlled as they are with contone printers. These variations often result in visually unacceptable results, because proper rendering of grayscale information is critical to the reproduction of graphical and image files.

One way to account for these variations is to pass grayscale command inputs through a transfer function to increase or decrease each grayscale command before beginning the halftone process. This transformation calibrates the printers by modifying the uncorrected grayscale inputs to values that, when provided to the printer, will result in the desired printed grayscale output. The transfer function is typically defined from the differences between commanded grayscale images and densitometer measurements. The transfer functions are implemented in the computer or server submitting the print job to the printer, or the printer itself.

In addition to the base transfer function required to account for the nominal dot gain and other printer characteristics, it is also desirable to store additional printer calibration functions. This allows the print software to simulate the behavior of different printers on a single print engine. For example, such transfer functions allow the print software to match an output that would be produced by both an APPLE® LASERWRITER™ and XEROX® DOCUTECH™ on an IBM® InfoPrint™ printer. Multiple transfer functions can also be used to control other types of behavior such as the compression and expansion of dynamic range.

Although the transfer function for a given printer can be determined a priori, it is subject to variation over time, humidity, temperature, and other factors. Hence, high quality printing often requires that the calibration curves be updated on a regular basis.

Unfortunately, in a network environment, periodically recalibrating all of the printer transfer functions used in a network configuration can be a difficult and time-consuming process. For example, some of the subject printers may be in a secured or remote location. Therefore, there is a need for a system which provides for a convenient propagation of updated printer calibration across all supported printer personalities. The present system satisfies that need.

SUMMARY OF THE INVENTION

To address the requirements described above, the present invention discloses a method, apparatus, and article of manufacture for calibrating digital halftoning algorithms with multiple personalities by updating the calibration of a printer or a scanner configured with a first calibration function l(i) and a second calibration function f(i). The method comprises the steps of applying the first calibration function to grayscale commands to obtain modified grayscale commands, printing the grayscale patches with the modified printing commands, and measuring the resulting grayscale values. Using this data, an updated printer calibration function t(i) is generated such that mapping the printer commands through t(i) results in printed grayscales substantially matching the commanded grayscales. Then, the updated printer calibration function t(i) is used to update the printer calibration function f(i) to obtain g(i). The apparatus comprises a means for obtaining modified grayscale commands by applying a first calibration function, a printer to print grayscale patches with the modified printing commands, and a scanner or densitometer for measuring the resulting grayscale values. The apparatus also comprises a means for obtaining an updated printer calibration function and a means for deriving an updated function g(i) based on the updated printer calibration function.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
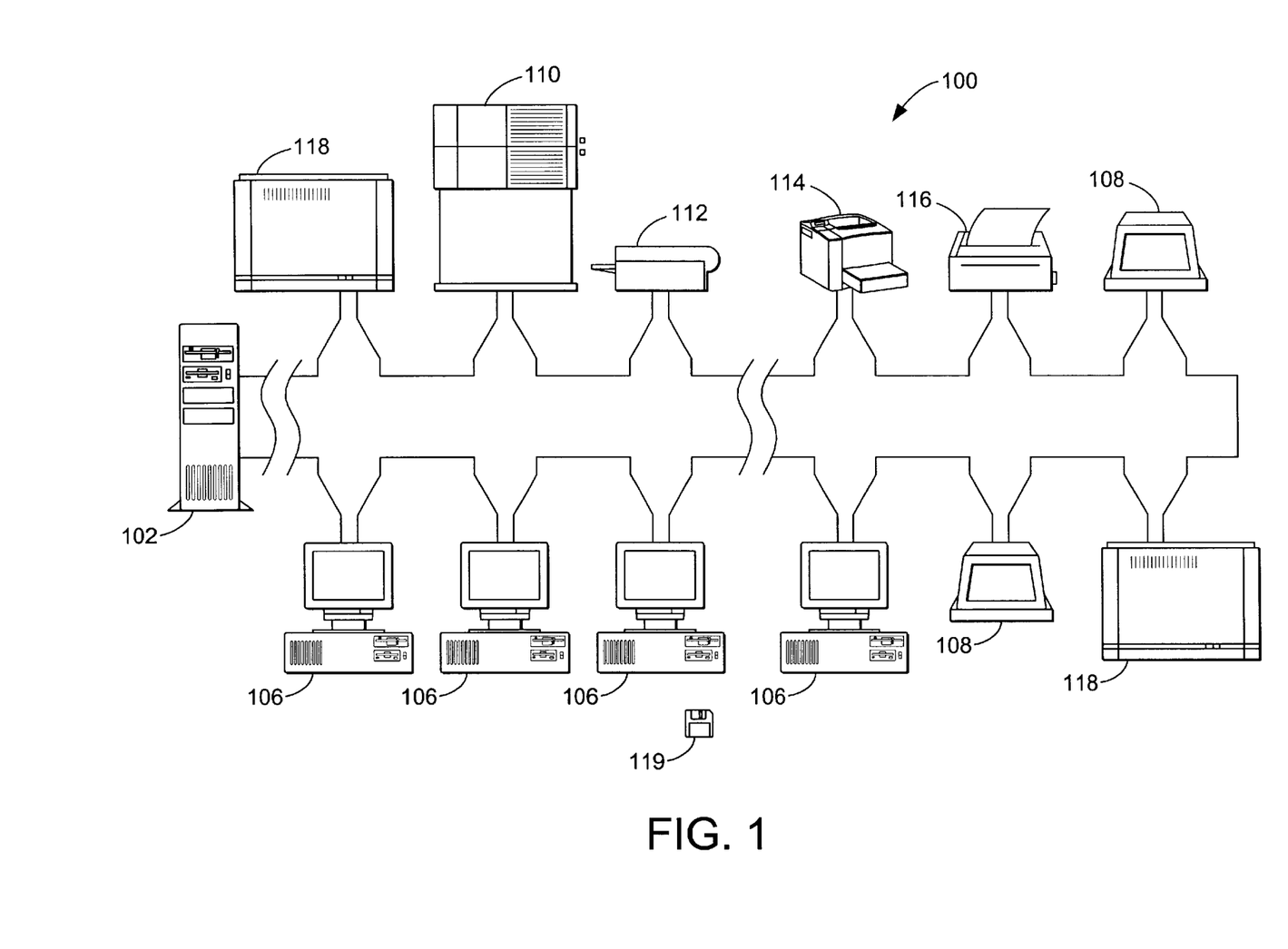
FIG. 1 is a diagram illustrating an exemplary hardware environment for a network printing system.

FIG. 1 is a diagram of an exemplary embodiment of a network printing system 100 adapted to implement the present invention. The network printing system 100 comprises a plurality of client components including a server 102, one or more desktop computers 106 and/or laptop computers 108, operatively coupled to a server 102 via network connectivity (e.g. token-ring, LAN, Etheniet, WAN, TCP/IP) 104. In the preferred embodiment, computers 106, 108 comprise personal computers under the control of an operating system, such as the WINDOWS operating system. However, computers 106, 108 could comprise any type of computer such as a workstation, mainframe, etc, and the operating system could comprise any operating system, including OS/2®, OS/390™, MVS, VM, AIX®; MACINTOSH®, MACINTOSH OS®, and UNIX®.

Computers 106, 108 include an input device (e.g., keyboard, mouse pointing device, voice activated input device, touch sensitive display, etc.), monitor (e.g., CRT, LCD displays, etc.), as well as a data communication device (e.g. modem, network interface, etc.) to interface with the network 100. A computer-readable medium such as floppy disk 119 tangibly embodies data or instructions for program steps performed by computers 106 and 108. The network printing system 100 also comprises one or more scanners 118 and one or more printer devices, including a high speed printer 110, a first printer 112, a second printer 114, and dot matrix printer 116.

Process

The general process for printing an image on one of the network printers 110–116 will now be described. Data representing an image comprised of grayscale level print commands is provided to the server 102 via the network connectivity 104. A print manager implemented in the server 102 applies a transfer function as described herein to the grayscale input values. This transfer function calibrates the printer by modifying the grayscale input values to account for printer dot gain and other printer non-linearities. Next, the print manager performs a halftoning process on the modified input values and creates a rasterized version of the image, which includes a bi-level input for each of the PELs (Picture ELements) in the print device. The rasterized version of the image is eventually transmitted to the printers 110–116.

Although the scaling, transfer function, and halftoning processes are described as being performed in the computers 106, 108 or the server 102, the invention may be advantageously practiced in other embodiments. For example, the transfer function and/or halftoning process may be implemented in the printers 110–116 as well, as these devices often have a resident central processing unit (CPU) and memory with sufficient capability.

The rasterized version of the image is created using a process known as digital halftoning to simulate tone (darkness) variations with printed dots. The halftoning process is also used to render image data in other binary devices (such as displays) as well. Digital halftoning simulates tone variations by varying the number and location of PELs to be activated within the printed area. Digital halftoning methods include clustered dot digital halftoning and dispersed dot digital halftoning. With clustered dot digital halftoning, dots are formed by multiple PELs, and are located on a regular grid, with one dot per halftone cell. With dispersed dot digital halftoning, dots are not located on a regular grid and appear as random dots. Dispersed dot digital halftoning requires high resolution, and stresses the printer's ability to print a single dot.

Figure 2A:
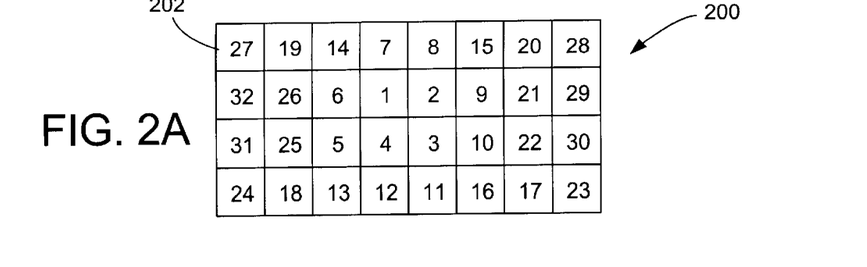
FIGS. 2A–2C are diagrams showing an example of a tiled rectangular threshold matrix and its operation.

FIG. 2A is a diagram showing the structure of a threshold array of a halftone cell 200, which comprises an array or cluster of PELs 202. The halftone cells 200 comprise an array of PELs used to render a dot, and are a basic building block of clustered dot ordered dithered halftones. The shape of the halftone cell can be selected to permit tiling across the printed image. Representative shapes include rectangular, diamond, and hexagonal shapes. One way to implement grayscale rendering in halftone cells is via the use of a threshold array or matrix.

Figure 2B:
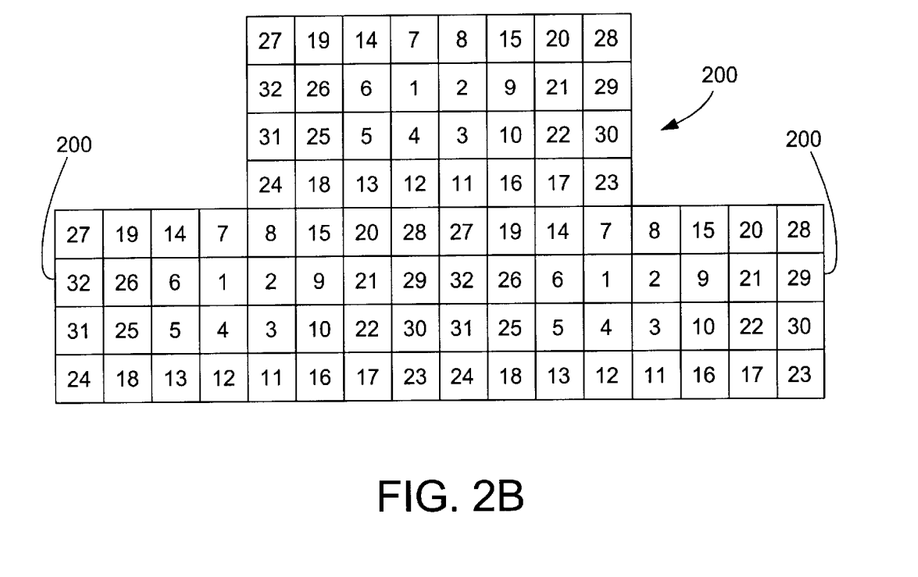

FIG. 2B is a diagram showing how the halftone cells 200 are aggregated or tiled together to cover the entire image to be printed. Rectangular halftone cells 200 are typically tiled together in a "bricklayed" arrangement as shown.

Figure 2C:
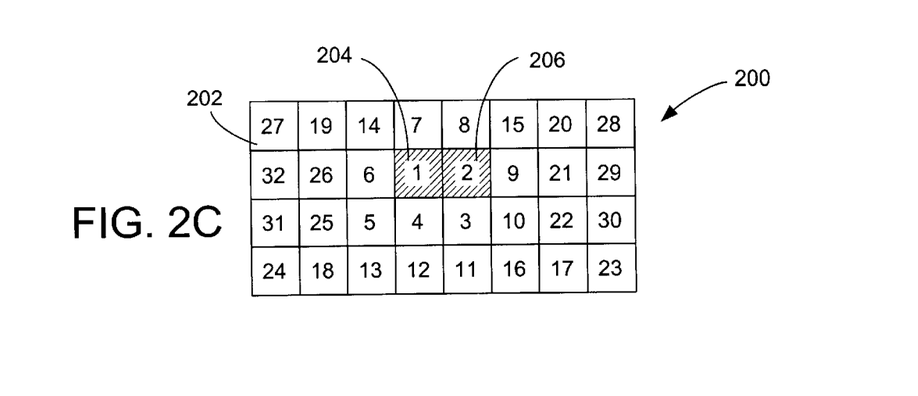

FIG. 2C is a diagram illustrating how dots are rendered using the threshold matrix. Each PEL 202 is activated when the command to that PEL 202 exceeds a specified threshold. As the grayscale command increases from pure white to black, individual PELs will be activated, and as the desired image becomes darker and darker, additional PELs are activated, thereby increasing the apparent size of the dot rendered by the halftone cell 200. The selection of thresholds required to activate each PEL in the threshold array determines the shape and size of the halftoning dots. As illustrated in FIG. 2C, when a specific threshold value is exceeded, a first PEL 204 is activated, rendering a small dot with the halftone cell. When a larger grayscale command is received, the command exceeds the threshold value for the second PEL 206, and the second PEL 206 is activated, thereby rendering a larger dot within the halftone cell. Since the surrounding PELs have not been activated, the result is one black dot in each halftone cell surrounded by white area from the inactive PELs. When a number of the halftone cells are viewed from a distance they collectively render the desired grayscale. Typically, the threshold values in the halftone cell arc made up of equally spaced (incremented) values.

As described above, the impact of printer non-linearities such as dot gain, screen type (from the halftone cell implementation), contone designs, and other factors cause substantial variation between the commanded grayscale print level and the resulting grayscale print level. The calibrating transfer function described above accounts for these factors by scaling commanded grayscale print levels up or down to a command value required to print the desired grayscales on the printer.

Figure 3:
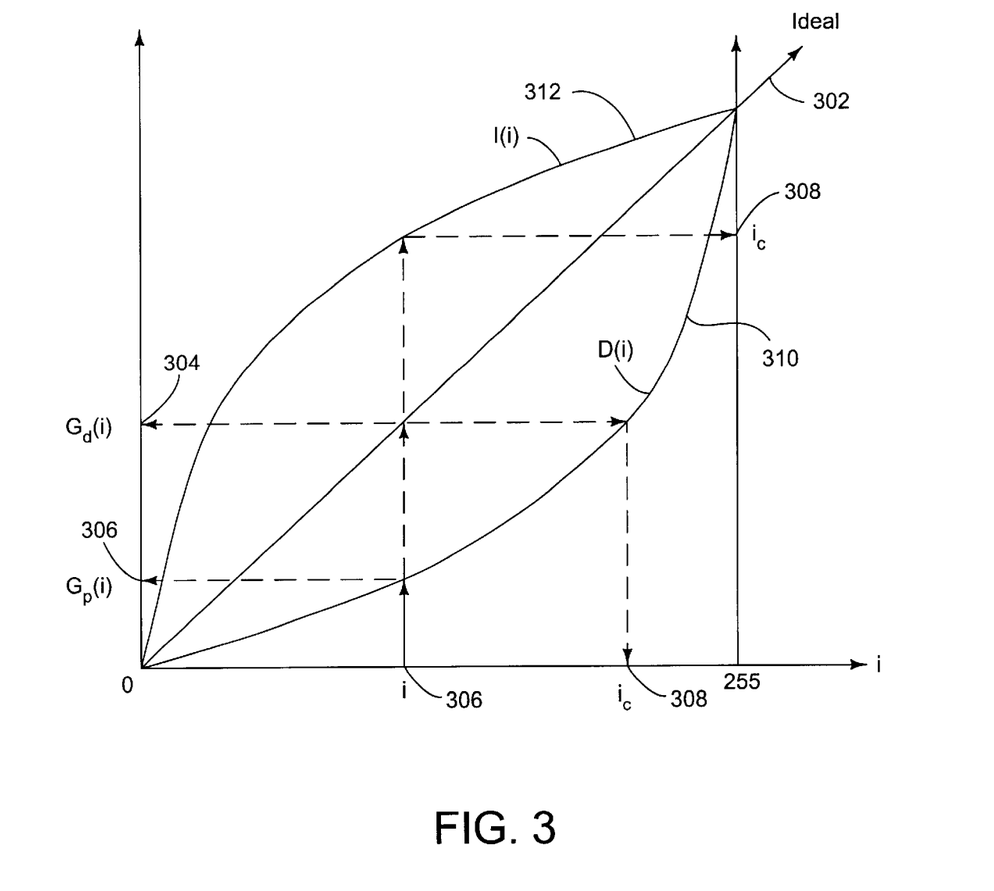
FIG. 3 is a diagram illustrating the generation and application of a calibration curve.

FIG. 3 is a diagram illustrating how the calibrating transfer function can be determined. The horizontal axis in FIG. 3 represents the grayscale command, and the vertical axis represents the printed grayscale values. Where 8 bits are used to represent the grayscale content, there are $2^8=256$ possible grayscale commands. In this case, the grayscale command can vary from a command of i=0 (which equates to "white") to a command of 255 (a command to print pure black). In an ideal printer, there is a linear relationship between the commanded grayscales and the printed grayscales. This linear relationship is denoted by linear function 302. For an ideal printer, a grayscale command of i would result in the desired grayscale $G_d(i)$ 304. However, because of dot gain and other printer personality factors, the printed grayscale $G_p(i)$ 306 will, in general, be different than the desired value $G_d(i)$ 304. These differences are described by curve $D(i)$ 310 which characterizes the relationship between commanded grayscale values 306 and printed grayscale values. To account for this difference, the printer 112 can be calibrated.

This is accomplished by mapping grayscale input commands i 306 to calibrated (or corrected) grayscale input commands $i_c$ 308. The value of $i_c$ is chosen to provide printed grayscale value $G_d(i)$ 304 as desired. The value of $i_c$ be determined by finding the value of $i_c$ corresponding to printed grayscale value $G_d(i)$ 304 for all i. The locus of these points defines a relationship between i and $i_c$ that is characterized by curve $l(i)$ 312.

Ideally, once a printer 112 has been calibrated by transfer function $l(i)$ 312, there should be a largely linear relationship between the commanded grayscale value and the printed grayscales. However, over time, factors such as age, temperature, and humidity, the actual relationship cause printer performance to deviate from this linear ideal, resulting in curve 404. Periodic calibration to update the calibration curves is required to maintain optimal printing results. A method for performing such periodic recalibration is described below.

Figure 4:
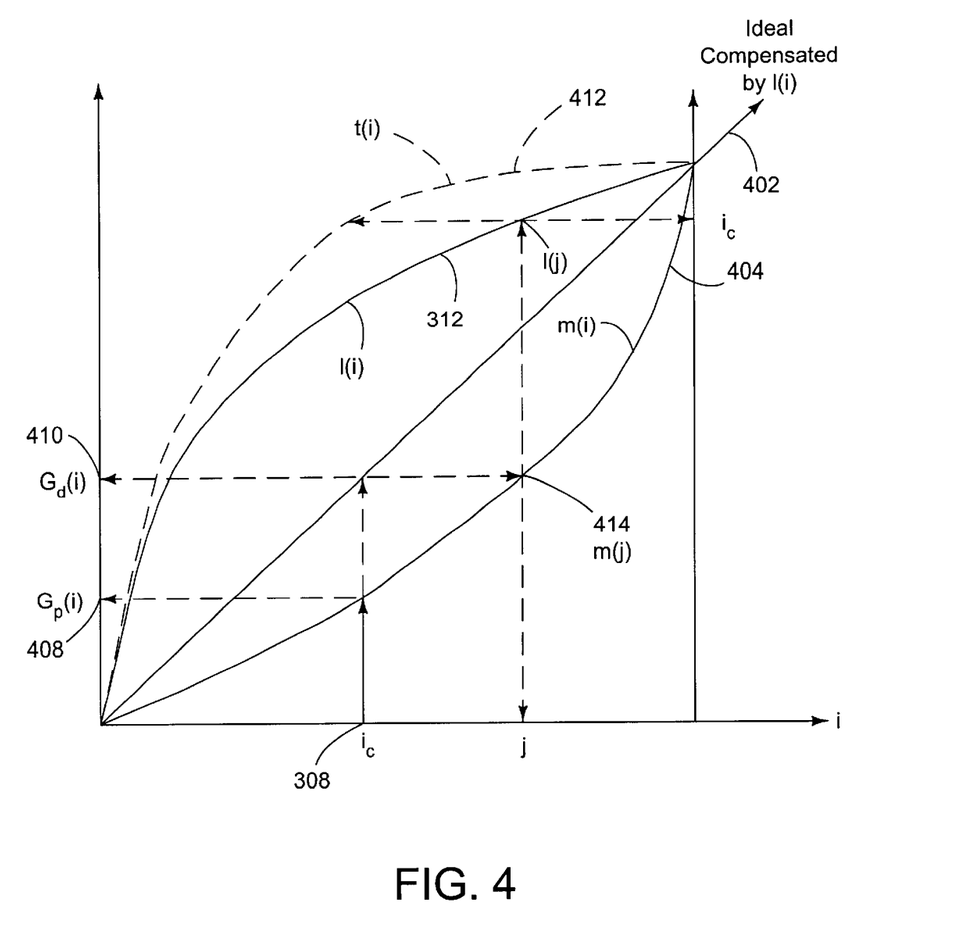
FIG. 4 is a diagram illustrating the generation and application of an updated calibration curve.

FIG. 4 is a diagram showing the effect of variations in printer personality factors. Curve 404 can be characterized by providing reference grayscale commands to the printer 112 and measuring the density (or reflectance) of the printed grayscales. This is accomplished by providing a number of grayscale print commands i 308 to the printer. These print commands are transformed in accordance with $l(i)$ as described above to arrive at calibrated grayscale command $i_c$. If the calibration effected by $l(i)$ were completely effective, grayscale print command $i_c$ would result in the desired grayscale value $G_d(i)$ 410. Instead, because of the factors listed above, the actual printed grayscale value $G_p(i)$ 408 is achieved. The printed grayscale values $G_p(i)$ 408 are measured with a densitometer or a device measuring reflecting light, such as a scanner. This data is used to construct $m(i)$ 404.

Although the number of commanded and printed grayscales would generally be equal to the total number of possible grayscales N (i.e. the total number of possible grayscales for an 8 bit index is $2^8=256$), it is also possible to use fewer grayscale print commands and associated printed grayscales. These missing grayscale measurements can be accounted for with the use of an interpolating or curve-fitting scheme to provide estimates for the values that were not measured. Similarly, data values of $m(i)$ can be filtered or otherwise processed to assure that the values are monotonically increasing or decreasing, if necessary. This process preserves the status of $t(i)$ as a function. That is, for all i, there is only one value of $t(i)$.

As shown in FIG. 4, curve $m(i)$ 404 can be used to derive an updated printer calibration curve $t(i)$ 412 for the printer 112. This is accomplished by finding $t(i)=l(j)$ where the value of j such that the measured grayscale value $m(j)$ 414 is closest to the desired grayscale value $G_d(i)$. By repeating this determination for all grayscale commands i, a locus of points is obtained which defines a new relationship between i and $i_c$ that is characterized by curve $t(i)$ 412. This can be represented mathematically according to the following relation:

$$t(i)=l(j) \text{ such that } j=arg[\min (|i-m(j)| \text{ for } j=0, 1, 2, \ldots N-1)]$$

Using the function $t(i)$, input grayscale commands i are mapped into corrected grayscale commands $i_c$, effectively recalibrating the printer 112.

Figure 5:
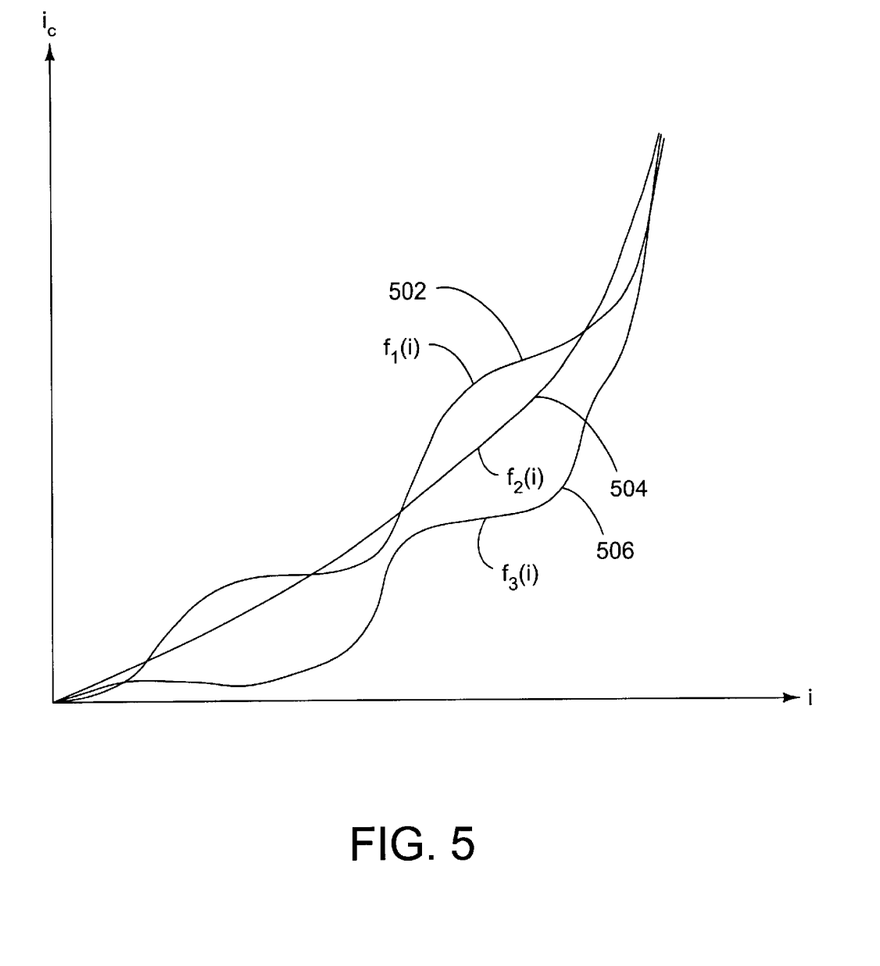
FIG. 5 is a diagram illustrating arbitrary calibration curves.

Other network printers, such as second printer 114, will generally have a different calibration function $f(i)$ than that of the first printer 112. As described earlier, printer 112 may include one or more arbitrary transfer functions to implement user or system selected grayscale printing characteristics, and to account for multiple printer personalities. FIG. 5 is a plot of arbitrary transfer functions $f_1(i)$ 502, $f_2(i)$ 504, and $f_3(i)$ 506, which map the commanded grayscale levels i to calibrated grayscale level commands.

Although the foregoing process could be repeated for all transfer functions and all printers in the network 100, this process would be unnecessarily time consuming. Instead, the relationship between $l(i)$ and $t(i)$ can be used to derive an updated calibration function for other transfer functions with a single set of densitometer measurements per printer.

Figure 6:
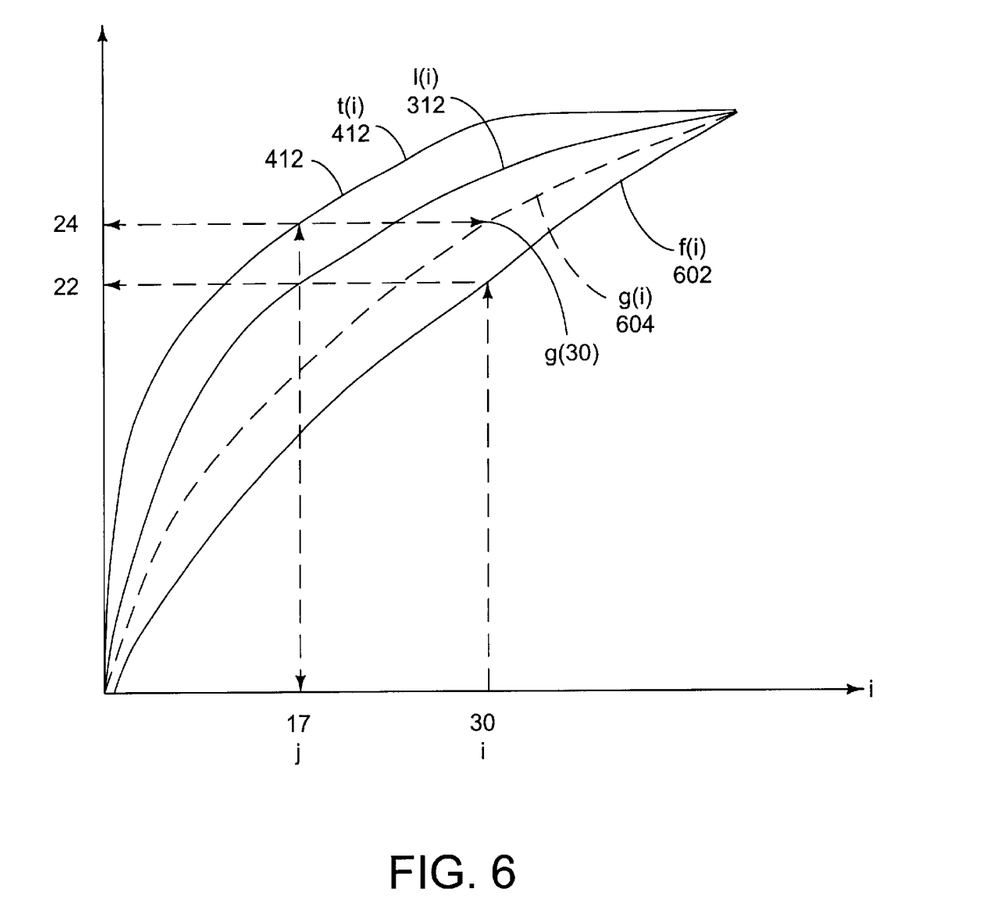
FIG. 6 is a diagram illustrating the determination of an updated arbitrary calibration curve.

FIG. 6 illustrates the process of using the relationships $l(i)$ 312, $t(i)$ 412, and $f(i)$ 602 to derive an updated calibration function $g(i)$ 604 for mapping grayscale commands. Assume for example that the initial calibration function for the second printer, $f(i)$, is known, and that $f(30)=22$ (indicating that $f(i)$ would transform an input grayscale command of 30 to an input grayscale command of 22 before halftoning). The problem then is to define a new calibration function based upon the new calibration measurements (which are now reflected in $t(i)$). This can be accomplished using $f(i)$, $l(i)$ and $t(i)$ as follows.

First, a value of j is such that $l(j)$ is as close as possible to $f(i)$ (which is 22 in this case) is determined. For purposes of illustration, suppose that value of j is 17, as shown in FIG. 6. Next, the value of $t(j)$ (in this case, $t(17)=24$) is determined. Finally, $g(i)$ is then defined as $t(j)$. In the illustrated example, this means that $g(30)$ is equal to 24. This process is repeated for all i, and can be represented mathematically as follows:

$$g(i)=t(j) \text{ such that } j=arg[\min(|f(i)-l(j)| \text{ for } j=0, 1, 2, \ldots, N-1).]$$

The transfer function $g(i)$ provides an updated calibration for other printers in the network, such as second printer 116.

Figure 7:
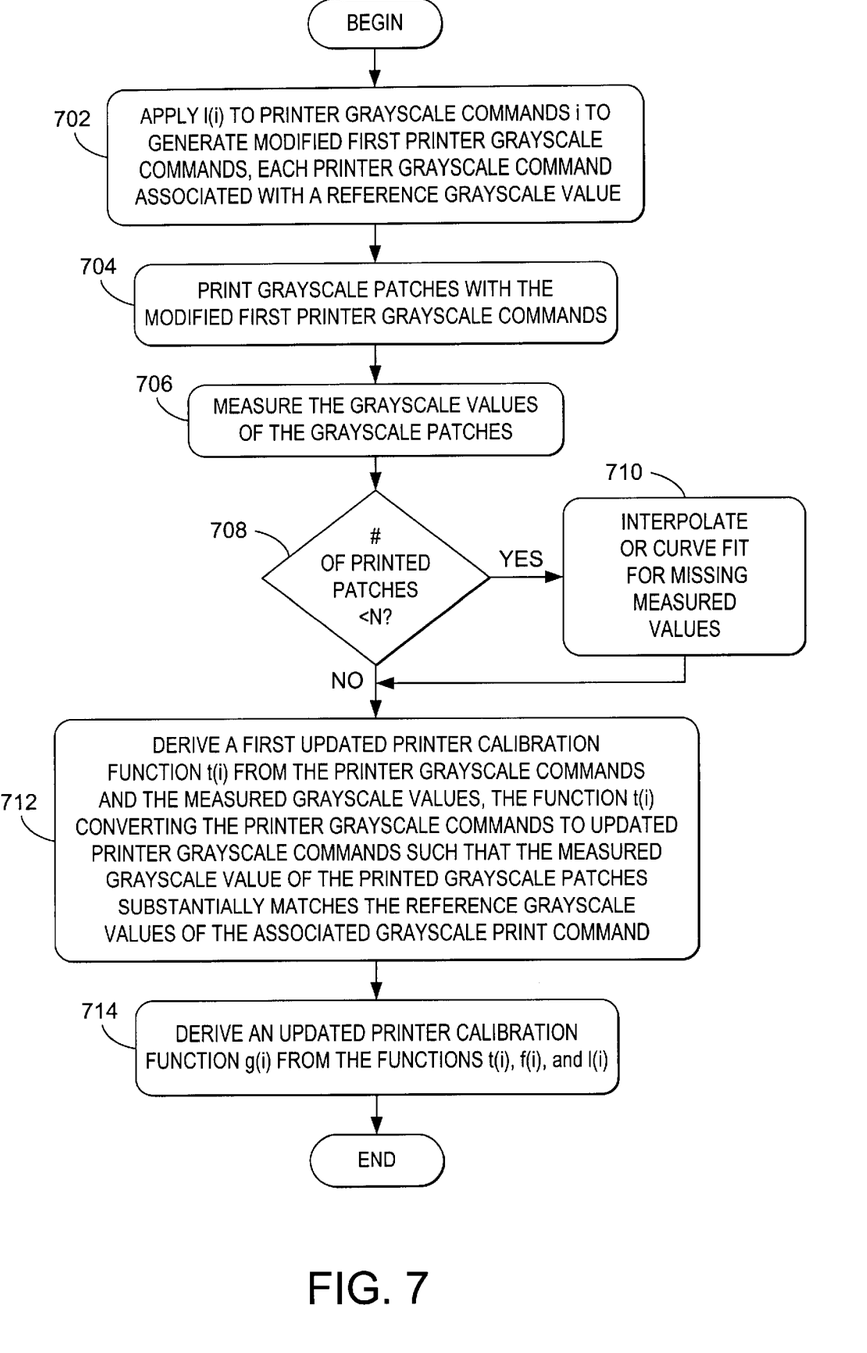
FIG. 7 is a flow chart describing the general operations used in one embodiment of the present invention.

FIG. 7 is a flow chart describing the operations performed in practicing one embodiment of the present invention. First, the transfer function $l(i)$ is applied to printer grayscale commands i to generate a modified first printer grayscale command associated with a reference grayscale value. This is depicted in block 702. As shown in block 704, these modified grayscale printer commands are used to print grayscale patches with the first printer 112. Then, the printed grayscales are measured 706. This measurement can be based on the density of the printed image, the reflectivity, or other suitable measure. Such measurements can be performed with a densitometer, a scanner, or similar device. In cases where a scanner is used to perform the measurements, the calibration process will calibrate the print/scan properties of the printer and scanner at the same time.

Although desirable, it is not necessary to print values for all possible grayscales. Instead, a smaller number can be reproduced, and the data for the missing data points extracted from the measured data by curve fitting or interpolation techniques. This is indicated by blocks 708 and 710. Then, an updated calibration function, $t(i)$ is derived 712 from the printer grayscale commands and the measured grayscale values. Function $t(i)$ updates the printer grayscale commands so that the grayscale value of the printed grayscale patches is close to that of the printer grayscale commands. Finally, an updated printer calibration function $g(i)$ is derived from the functions $t(i)$, $f(i)$, and $l(i)$.

Figure 8:
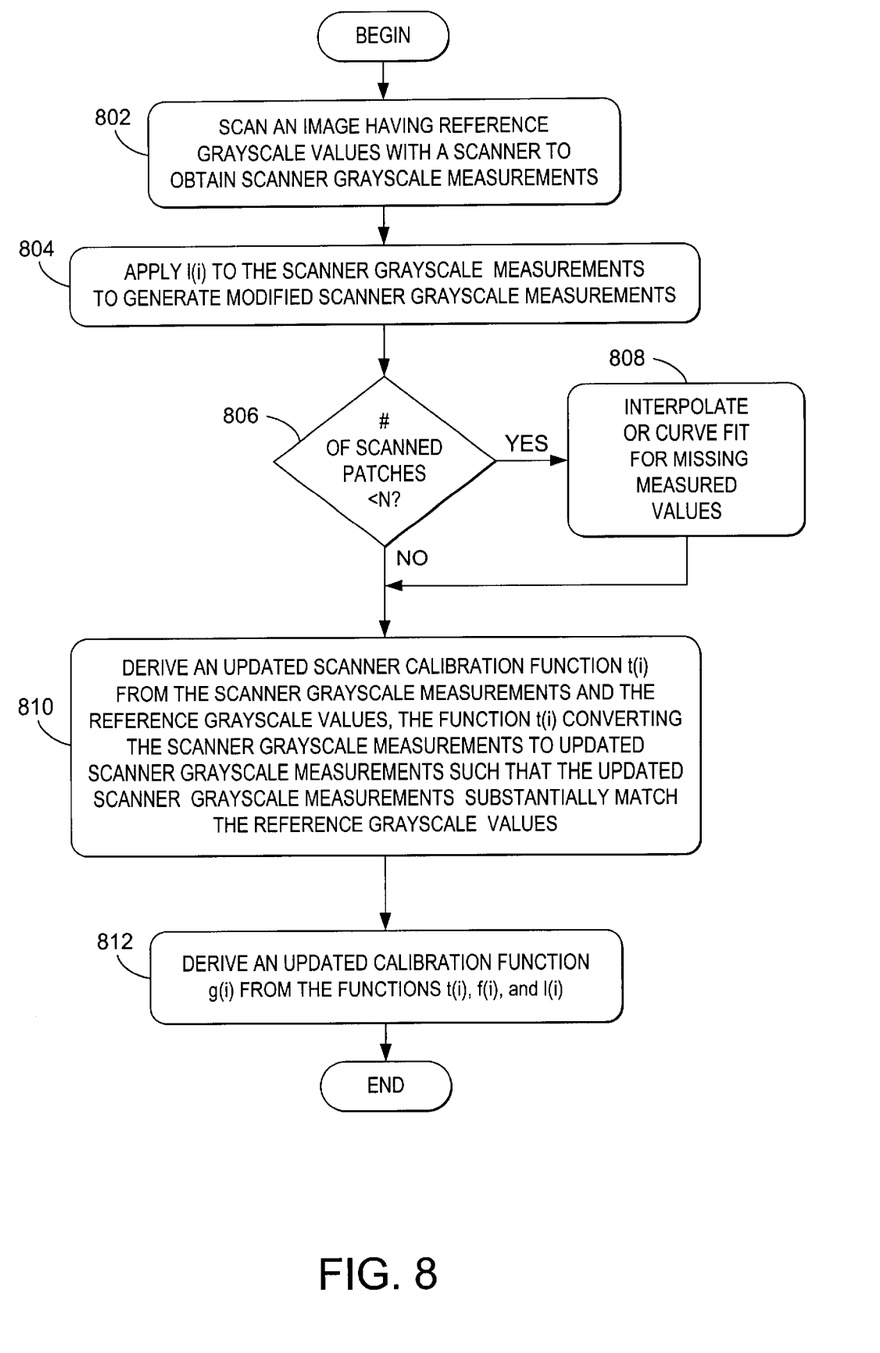
FIG. 8 is a flow chart of the operations used to characterize the grayscale scanning characteristics.

FIG. 8 is a flow chart illustrating the operations used to characterize grayscale scanning characteristics. The process begins by scanning 802 an image with a scanner 118 to obtain scanner grayscale measurements. Preferably, the image comprises patches with known grayscale values, which are used as reference values. Next, transfer function l(i) is applied to the scanner grayscale measurements, thereby generating modified scanner grayscale measurements. This is illustrated in block 804. As before, if the number of scanned patches does not span all possible grayscale values N, the missing values are determined by interpolation or curve fitting, as shown in blocks 806 and 808. Thereafter, an updated scanning calibration function t(i) is derived 810 from the scanner measurements and the reference grayscale values. This function converts the scanner grayscale measurements to updated measurements which substantially match the reference grayscale values. Finally, an updated calibration function g(i) is derived from t(i), f(i) and l(i), as shown in block 812.

Conclusion

This concludes the description of the preferred embodiments of the present invention. In summary, the present invention describes a method, apparatus, and article of manufacture for updating the calibration of a printer or a scanner using a first calibration function l(i) and a second calibration function f(i). The method comprises the steps of applying the first calibration function to grayscale commands to obtain modified grayscale commands, printing the grayscale patches with the modified printing commands, and measuring the resulting grayscale values. Using this data, an updated printer calibration function t(i) is generated such that mapping the printer commands through t(i) results in printed grayscales substantially matching the commanded grayscales. Then, the updated printer calibration function t(i) is used to update the printer calibration function f(i) to obtain g(i).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of updating a calibration of a printer using a first calibration function l(i) and a second calibration function f(i), comprising the steps of:

applying l(i) to printer grayscale commands i to generate modified printer grayscale commands, each printer grayscale command associated with a reference grayscale value;

printing grayscale patches with the modified printer grayscale commands, each grayscale patch manifesting a grayscale value;

measuring the grayscale values of the grayscale patches;

deriving a first updated printer calibration function t(i) from the printer grayscale commands and the measured grayscale values, the function t(i) converting the printer grayscale commands to updated printer grayscale commands such that the measured grayscale value of the printed grayscale patches substantially matches the reference grayscale values of the associated grayscale value print command;

deriving a second updated printer calibration function g(i) from the functions t(i), f(i), and l(i); and wherein N represents a number of possible grayscale values, and the step of deriving g(i) comprises the step of determining g(i) according to the relation:

$$g(i)=t(j) \text{ such that } j=arg[\min(|f(i)-l(j)| \text{ for } j=0, 1, 2, N-1)].$$

2. The method of claim 1, further comprising the steps of modifying the measured grayscales printed by the printer such that the data values are monotonically increasing.

3. The method of claim 1, further comprising the steps of modifying the measured grayscales printed by the printer such that the data values are monotonically decreasing.

4. The method of claim 1, wherein M is a number of printed patches such that M<N, and:

the method further comprises the step of interpolating between the measured grayscale values; and the function t(i) is derived from the measured and interpolated grayscale values.

5. The method of claim 1, wherein the step of measuring the grayscale values printed by the printer comprises the steps of:

scanning the grayscales patches printed by the printer in a scanner; and computing the measured grayscale value for each grayscale patch.

6. A method of updating a calibration of a scanner using a first calibration function l(i) and a second calibration function f(i), comprising the steps of:

scanning an image having reference grayscale values with the scanner to obtain scanner grayscale measurements;

applying l(i) to the scanner grayscale measurements to generate modified scanner grayscale measurements;

deriving an updated scanner calibration function t(i) from the scanner grayscale measurements and the reference grayscale values, the function t(i) converting the scanner grayscale measurements to updated scanner grayscale measurements such that the updated scanner grayscale measurements substantially match the reference grayscale values;

deriving an updated calibration function g(i) from t(i), f(i) and l(i) and wherein N represents a number of possible grayscale values and the step of deriving g(i) comprises the step of determining g(i) according to the relation:

$$g(i)=t(j) \text{ such that } j=arg[\min(|f(i)-l(j)| \text{ for } j=0, 1, 2, \ldots N-1)].$$

7. An apparatus for updating a calibration of a printer using a first calibration function l(i) and a second calibration function f(i), comprising:

means for applying l(i) to printer grayscale commands i to generate modified printer grayscale commands, each printer grayscale command associated with a reference grayscale value;

a printer for printing grayscale patches with the modified printer grayscale commands, each grayscale patch manifesting a grayscale value;

means for measuring the grayscale values of the grayscale patches;

means for deriving an updated first printer calibration function t(i) from the printer grayscale commands and the measured grayscale values, the function t(i) converting the printer grayscale commands to updated printer grayscale commands such that the measured grayscale value of the printed grayscale patches substantially matches the reference grayscale values of the associated grayscale value print command;

means for deriving an updated second printer calibration function g(i) from the functions t(i), f(i), and l(i); and wherein N represents a number of possible grayscale values, and the means for deriving g(i) comprises means for determining g(i) according to the relation:

$$g(i)=t(j) \text{ such that } j=arg[\min(|f(i)-l(j)| \text{ for } j=0, 1, 2, \ldots N-1)].$$

8. The apparatus of claim 7, further comprising means for modifying the measured grayscales printed by the printer such that the data values are monotonically increasing.

9. The apparatus of claim 7, further comprising means for modifying the measured grayscales printed by the printer such that the data values are monotonically decreasing.

10. The apparatus of claim 7, wherein M is a number of printed patches such that M<N and:
 the apparatus further comprises means for interpolating between the measured grayscale values; and
 the function t(i) is derived from the measured and interpolated grayscale values.

11. The apparatus of claim 7, wherein the means for measuring the grayscale values printed by the printer comprises a scanner for measuring the grayscales patches printed by the printer, and for computing the measured grayscale value for each grayscale patch.

12. An apparatus for updating a calibration of a scanner using a first calibration function l(i) and a second calibration function f(i), comprising:
 a scanner for scanning an image having reference grayscale values to obtain scanner grayscale measurements;
 means for applying l(i) to the scanner grayscale measurements to generate modified scanner grayscale measurements;
 means for deriving an updated first scanner calibration function t(i) from the scanner grayscale measurements and the reference grayscale values, the function t(i) converting the scanner grayscale measurements to updated scanner grayscale measurements such that the updated scanner grayscale measurements substantially match the reference grayscale values;
 means for deriving an updated second calibration function g(i) from t(i), f(i) and l(i); and
 wherein N represents a number of possible grayscale values and the means for deriving g(i) comprises the step of determining g(i) according to the relation:

$$g(i)=t(j) \text{ such that } j=arg[\min(|f(i)-l(i)| \text{ for } j=0, 1, 2, \ldots N-1)].$$

13. A program storage device, readable by computer, tangibly embodying one or more programs of instructions executable by the computer to perform method steps of updating a calibration of a printer using a first calibration function l(i) and a second calibration function f(i), the method steps comprising the steps of:
 applying l(i) to printer grayscale commands i to generate modified printer grayscale commands, each printer grayscale command associated with a reference grayscale value;
 printing grayscale patches with the modified printer grayscale commands, each grayscale patch manifesting a grayscale value;
 measuring the grayscale values of the grayscale patches;
 deriving a updated first printer calibration function t(i) from the printer grayscale commands and the measured grayscale values, the function t(i) converting the printer grayscale commands to updated printer grayscale commands such that the measured grayscale value of the printed grayscale patches substantially matches the reference grayscale values of the associated grayscale value print command;
 deriving a second updated second printer calibration function g(i) from the functions t(i), f(i), and l(i); and
 wherein N represents a number of possible grayscale values, and the method step of deriving g(i) comprises the method step of determining g(i) according to the relation:

$$g(i)=t(j) \text{ such that } j=arg[\min(|f(i)-l(j)| \text{ for } j=0, 1, 2, \ldots N-1)].$$

14. The program storage device of claim 13, wherein the method steps further comprise the method steps of modifying the measured grayscales printed by the printer such that the data values are monotonically increasing.

15. The program storage device of claim 13, wherein the method steps further comprise the steps of modifying the measured grayscales printed by the printer such that the data values are monotonically decreasing.

16. The program storage device of claim 13, wherein M is a number of printed patches such that M<N, and:
 the method steps further comprise the method step of interpolating between the measured grayscale values; and
 the function t(i) is derived from the measured and interpolated grayscale values.

17. The program storage device of claim 13, wherein the method step of measuring the grayscale values printed by the printer comprises the method steps of:
 scanning the grayscales patches printed by the printer in a scanner; and
 computing the measured grayscale value for each grayscale patch.

18. A program storage device, readable by computer, tangibly embodying one or more programs of instructions executable by the computer to perform method steps of updating a calibration of a scanner using a first calibration function l(i) and a second calibration function f(i), the method steps comprising the steps of:
 scanning an image having reference grayscale values with the scanner to obtain scanner grayscale measurements;
 applying l(i) to the scanner grayscale measurements to generate modified scanner grayscale measurements;
 deriving a first updated scanner calibration function t(i) from the scanner grayscale measurements and the reference grayscale values, the function t(i) converting the scanner grayscale measurements to updated scanner grayscale measurements such that the updated scanner grayscale measurements substantially match the reference grayscale values;
 deriving a second updated calibration function g(i) from t(i), f(i) and l(i); and
 wherein N represents a number of possible grayscale values and the method step of deriving g(i) comprises the method step of determining g(i) according to the relation:

$$g(i)=t(j) \text{ such that } j=arg[\min(|f(i)-l(j)| \text{ for } j=0, 1, 2, \ldots N-1)].$$

19. A memory for storing an updated first calibration function t(i) derived from a first calibration function l(i) and an updated second calibration function g(i) derived from a second calibration function f(i), wherein i represents printer grayscale commands, wherein the updated printer calibration functions g(i) and f(i) are derived by performing the steps of:

applying l(i) to the printer grayscale commands to generate modified printer grayscale commands, each printer grayscale command associated with a reference grayscale value;

printing grayscale patches with the modified printer grayscale commands, each grayscale patch manifesting a grayscale value;

measuring the grayscale values of the grayscale patches;

deriving the updated printer calibration function t(i) from the printed grayscale commands and the measured grayscale values, the function t(i) converting the printer grayscale commands to updated printer grayscale commands such that the measured grayscale values of the printed grayscale patches substantially matches the reference grayscale values of the associated grayscale value print command;

deriving the updated printer calibration function g(i) from the functions t(i), f(i), and l(i); and wherein N represents a number of possible grayscale values and the method step of deriving g(i) comprises the method step of determining g(i) according to the relation:

$$g(i)=t(j) \text{ such that } j=arg[\min(|f(i)-l(j)| \text{ for } j=0, 1, 2, \ldots N-1)].$$

20. The memory of claim 19, wherein the steps for deriving updated printer calibration functions g(i) and f(i) further comprising the steps of:

modifying the measured grayscales printed by the printer such that the data values are monotonically increasing.

21. The memory of claim 19, wherein the steps for deriving updated printer calibration functions g(i) and f(i) further comprising the steps of:

modifying the measured grayscales printed by the printer such that the data values are monotonically decreasing.

22. The memory of claim 19, wherein:

M is a number of printed patches such that M<N;

the steps for deriving updated printer calibration functions g(i) and f(i) further comprises the step of interpolating between the measured grayscale values; and the function t(i) is derived from the measured and interpolated grayscale values.

* * * * *